US012713136B2

(12) United States Patent
Inada

(10) Patent No.: US 12,713,136 B2
(45) Date of Patent: Aug. 18, 2026

(54) POSITION DETECTION USING DIRECTED LIGHT EVENTS

(71) Applicant: Sony Interactive Entertainment Inc., Tokyo (JP)

(72) Inventor: Tetsugo Inada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 1032 days.

(21) Appl. No.: 17/595,790

(22) PCT Filed: Jun. 25, 2019

(86) PCT No.: PCT/JP2019/025112
§ 371 (c)(1),
(2) Date: Nov. 24, 2021

(87) PCT Pub. No.: WO2020/261370
PCT Pub. Date: Dec. 30, 2020

(65) Prior Publication Data

US 2022/0311923 A1 Sep. 29, 2022

(51) Int. Cl.
*H04N 23/71* (2023.01)
*H04N 23/74* (2023.01)
*H04N 25/50* (2023.01)

(52) U.S. Cl.
CPC ............. *H04N 23/71* (2023.01); *H04N 23/74* (2023.01); *H04N 25/50* (2023.01)

(58) Field of Classification Search
CPC .. H04N 25/50; H04N 23/56; H04N 23/71–74; G01B 11/24; G01S 7/48–51
See application file for complete search history.

(56) References Cited

U.S. PATENT DOCUMENTS 9,389,693 B2 7/2016 Lee
11,122,224 B2 9/2021 Suh
(Continued)

FOREIGN PATENT DOCUMENTS

EP 3477341 A1 5/2019
JP 2014535098 A 12/2014
JP 2018085725 A 5/2018

OTHER PUBLICATIONS

International Search Report for corresponding PCT Application No. PCT/JP2019/025112, 3 pages, dated Sep. 17, 2019.

*Primary Examiner* — Yuqing Xiao
*Assistant Examiner* — Chia-Ling Chen
(74) *Attorney, Agent, or Firm* — Kilpatrick Townsend & Stockton LLP

(57) ABSTRACT

A system includes an event-driven type vision sensor that outputs an event signal indicating a two-dimensional position which is located within a field of view of the vision sensor and at which a light intensity change has occurred in a space, and a time of day at which the light intensity change has occurred, a light source that emits light having directivity toward the space, and a position detecting device including an event signal receiving section that receives the event signal, and a position detecting section that detects a three-dimensional position of the light intensity change on the basis of an angle at which the light source has emitted the light at the time of day, the two-dimensional position, and a positional relation between the vision sensor and the light source.

9 Claims, 6 Drawing Sheets

(56) References Cited

U.S. PATENT DOCUMENTS

| | | | | |
|---|---|---|---|---|
| 2013/0218398 | A1* | 8/2013 | Gandhi | B60R 16/02 701/31.1 |
| 2014/0085621 | A1 | 3/2014 | Lee | |
| 2014/0320403 | A1 | 10/2014 | Lee | |
| 2017/0366801 | A1* | 12/2017 | Horesh | H04N 13/296 |
| 2018/0113200 | A1* | 4/2018 | Steinberg | G01S 7/4861 |
| 2018/0146149 | A1 | 5/2018 | Suh | |
| 2019/0045173 | A1* | 2/2019 | Hicks | G01B 11/2545 |
| 2020/0249354 | A1* | 8/2020 | Yeruhami | G01S 7/4815 |
| 2022/0042823 | A1* | 2/2022 | Lee | G01C 11/02 |

* cited by examiner

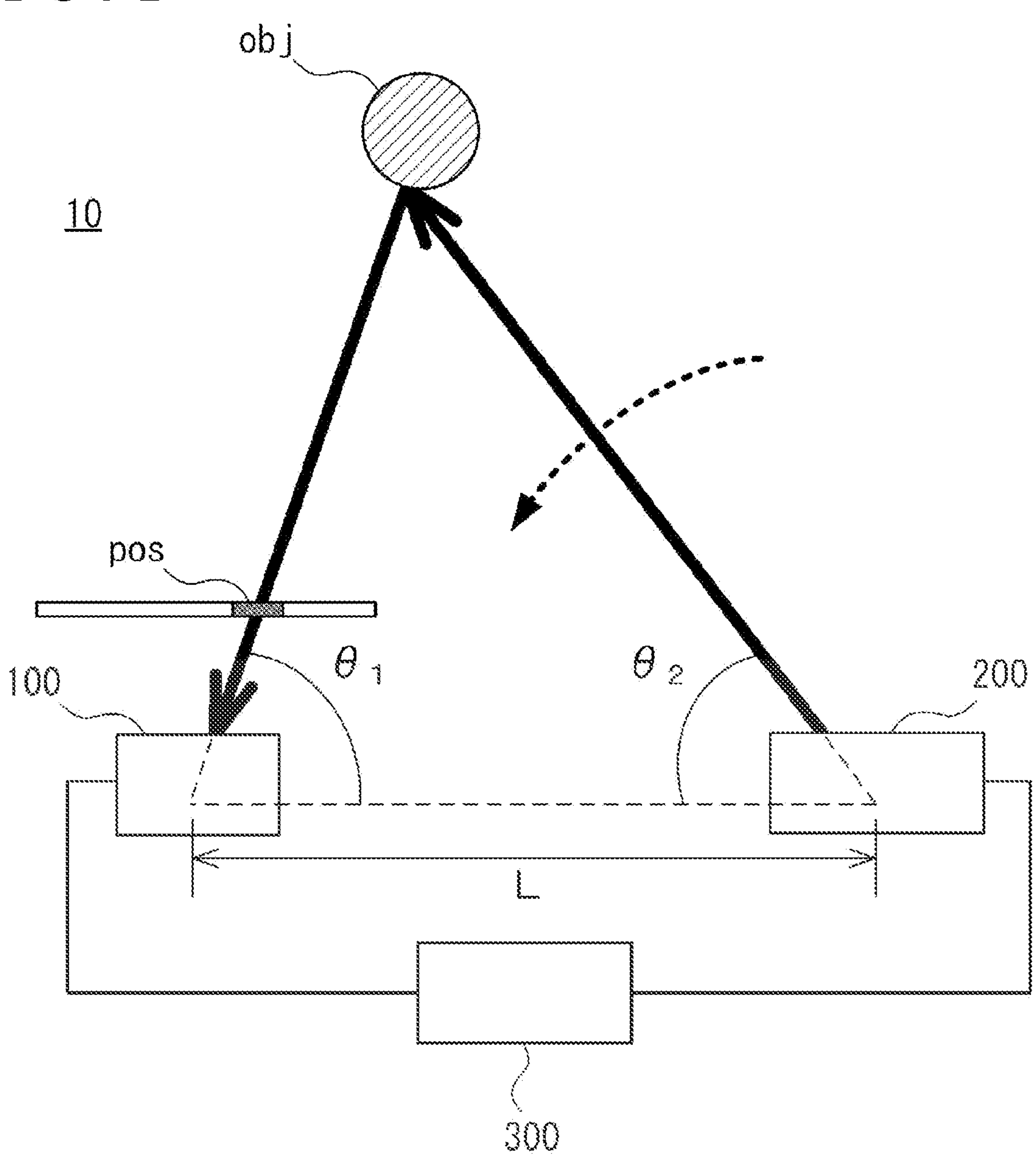
F I G . 1
obj
10
pos
θ 1
θ 2
100
200
L
300

POSITION DETECTION USING DIRECTED LIGHT EVENTS

TECHNICAL FIELD

The present invention relates to a system, a position detecting device, a position detecting method, and a program.

BACKGROUND ART

There is known an event-driven type vision senor in which a pixel having detected a change in intensity of incident light generates a signal time-asynchronously. The event-driven type vision sensor is advantageous in that it is capable of operating at a high speed and with low power consumption, as compared with a frame type vision sensor, specifically, an image sensor such as a charge coupled device (CCD) or a complementary metal oxide semiconductor (CMOS) which scans all pixels at intervals of a predetermined cycle. Techniques for such an event-driven type vision sensor are described in, for example, PTL 1 and PTL 2.

CITATION LIST

Patent Literature

[PTL 1] JP 2014-535098T [PTL 2] JP 2018-85725A

SUMMARY

Technical Problem

Regarding the event-driven type sensor, however, although such advantages as described above are known, it is hard to say that peripheral techniques that take into consideration its characteristics different from those of a conventional vision sensor, for example, the frame type vision sensor, have been sufficiently proposed.

Thus, the present invention is intended to provide a system, a position detecting device, a position detecting method, and a program that are capable of detecting a position of an object in a space at a high speed and with accuracy by using an event-driven type vision sensor.

Solution to Problem

According to an aspect of the present invention, provided is a system including an event-driven type vision sensor that outputs an event signal indicating a two-dimensional position which is located within a field of view of the vision sensor and at which a light intensity change has occurred in a space, and a time of day at which the light intensity change has occurred, a light source that emits light having directivity toward the space, and a position detecting device including an event signal receiving section that receives the event signal, and a position detecting section that detects a three-dimensional position of the light intensity change on a basis of an angle at which the light source has emitted the light at the time of day, the two-dimensional position, and a positional relation between the vision sensor and the light source.

According to another aspect of the present invention, provided is a position detecting device including an event signal receiving section that, from an event-driven type vision sensor oriented toward a space, receives an event signal indicating a two-dimensional position which is located within a field of view of the vision sensor and at which a light intensity change has occurred in the space, and a time of day at which the light intensity change has occurred, and a position detecting section that detects a three-dimensional position of the light intensity change on a basis of an angle at which a light source that emits light having directivity toward the space has emitted the light at the time of day, the two-dimensional position, and a positional relation between the vision sensor and the light source.

According to still another aspect of the present invention, provided is a position detecting method including a step of receiving, from an event-driven type vision sensor oriented toward a space, an event signal indicating a two-dimensional position which is located within a field of view of the vision sensor and at which a light intensity change has occurred in the space, and a time of day at which the light intensity change has occurred, and a step of detecting a three-dimensional position of the light intensity change on a basis of an angle at which a light source that emits light having directivity toward the space has emitted the light at the time of day, the two-dimensional position, and a positional relation between the vision sensor and the light source.

According to yet another aspect of the present invention, provided is a program that causes a computer to function as a position detecting device including an event signal receiving section that, from an event-driven type vision sensor oriented toward a space, receives an event signal indicating a two-dimensional position which is located within a field of view of the vision sensor and at which a light intensity change has occurred in the space, and a time of day at which the light intensity change has occurred, and a position detecting section that detects a three-dimensional position of the light intensity change on a basis of an angle at which a light source that emits light having directivity toward the space has emitted the light at the time of day, the two-dimensional position, and a positional relation between the vision sensor and the light source.

According to the above-described configurations, a position of an object in a space can be detected at a high speed and with accuracy by using an event-driven type vision sensor.

BRIEF DESCRIPTION OF DRAWINGS

FIG. 1 is a diagram illustrating a schematic configuration of a system according to an embodiment of the present invention.

FIG. 2 is a block diagram illustrating a functional configuration of a position detecting device illustrated in FIG. 1.

FIG. 6 is a flowchart illustrating an example of processing in the embodiment of the present invention.

DESCRIPTION OF EMBODIMENT

Figure 3:
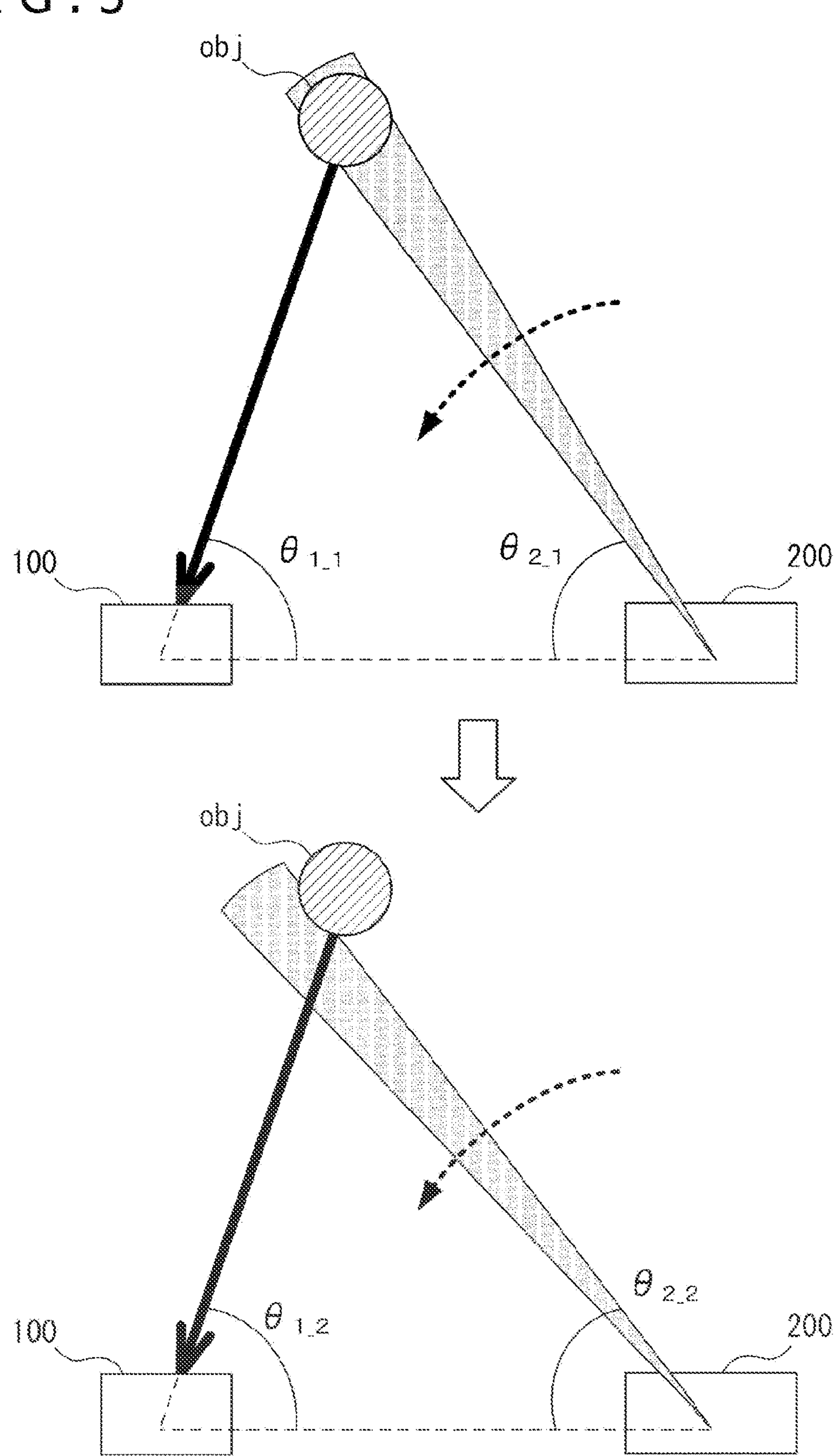
FIG. 3 is a diagram illustrating an additional configuration of the embodiment of the present invention.

Hereinafter, a preferred embodiment of the present invention will be described in detail referring to the accompanying drawings. Note that, in the present description and the drawings, for constituent elements having substantially the same functional configuration, duplicated descriptions will be omitted by denoting them by the same reference sign.

FIG. 1 is a diagram illustrating a schematic configuration of a system according to an embodiment of the present invention. In the illustrated example, a system 10 includes an event-driven type vision sensor 100, a light source 200, and a position detecting device 300. The vision sensor 100 includes a sensor array in which arrayed are asynchronous-type solid-state image sensors that each generate an event signal upon detection of an intensity change, more specifically, a luminance change, in light that is incident through an unillustrated optical system.

Here, the asynchronous-type solid-state image sensors included in the vision sensor 100 each include an address event representation (AER) circuit. The address event means that, at a certain pixel address, an amount of light of a pixel has varied and an amount of the variation thereof has exceeded a threshold value. Specifically, the address event includes an on-event indicating that an amount of light of a pixel has varied and has overrun a predetermined upper limit value, and an off-event indicating that an amount of light of a pixel has varied and has underrun a predetermined lower limit value. The event signal output from the vision sensor 100 includes a pixel address, a flag indicating the kind of the address event (the on-event or the off-event), and a time stamp. The pixel address included in the event signal indicates a two-dimensional position pos which is located within a field of view of the vision sensor 100 and at which a light intensity change has occurred in a space toward which the vision sensor 100 is oriented. Further, the time stamp indicates a time of day at which the light intensity change has occurred.

The light source 200 emits light having directivity toward the same space as the space toward which the vision sensor 100 is oriented. The light having directivity is, for example, infrared laser. For example, the light source 200 scans the space by emitting the light having directivity in the form of a line, and changing an angle of the emission in a time-series pattern in a direction intersecting with the line. In this case, the light source 200 changes the angle of the emission for each time of day that is synchronized with or can be matched with the time stamp of the event signal output by the vision sensor 100. The angle of the emission at each time of day is specified in advance to the light source 200 from the position detecting device 300 or is transmitted to the position detecting device 300 from the light source 200.

Figure 2:
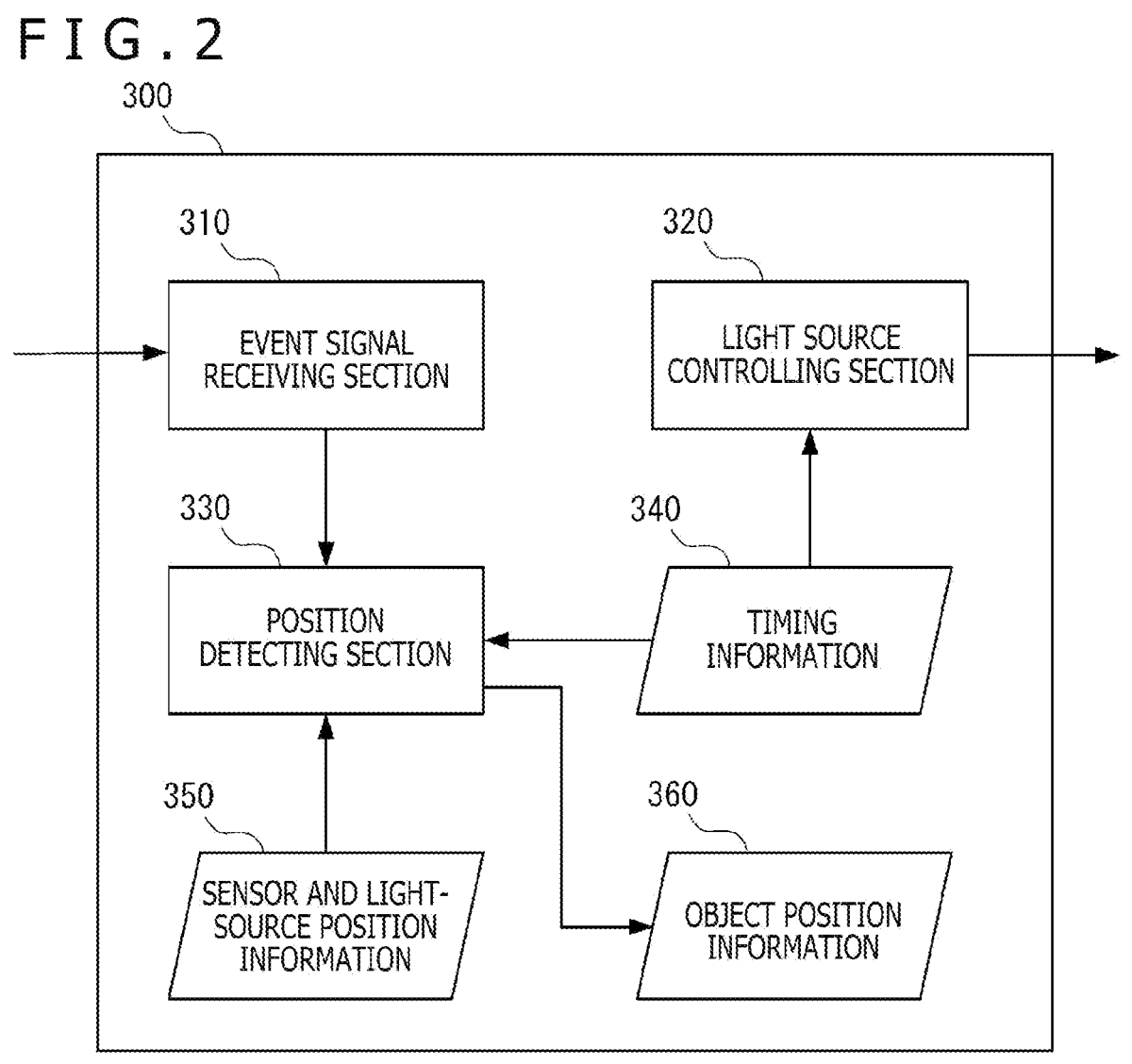

FIG. 2 is a block diagram illustrating a functional configuration of the position detecting device illustrated in FIG. 1. In the illustrated example of FIG. 2, the position detecting device 300 is implemented by a computer including, for example, a communication interface, a processor, and a memory, and includes functional sections of an event signal receiving section 310, a light source controlling section 320, and a position detecting section 330 that are implemented by causing the processor to operate according to a program stored in the memory or having been received via the communication interface.

Here, for example, the position detecting device 300 may be embedded in the same device as a device including the vision sensor 100 and the light source 200. Further, for example, the position detecting device 300 may be a terminal device that is disposed in the same space as a space in which the vision sensor 100 and the light source 200 are disposed and that communicates with each of the vision sensor 100 and the light source 200, or may be a server device that is coupled with the vision sensor 100 and the light source 200 via a network. Further, some of the functions of the position detecting device 300 may be implemented in the terminal device, and the other ones of the functions thereof may be implemented in the server device.

The event signal receiving section 310 receives the event signal from the vision sensor 100. As described above, the event signal is information indicating the two-dimensional position which is located within the field of view of the vision sensor 100 and at which the light intensity change has occurred in the space, and the time of day at which the light intensity change has occurred.

The light source controlling section 320 controls the light source 200 according to timing information 340 indicating an angle of the emission of the light at each time of day. Alternatively, in a case where the light source 200 transmits the angle of the emission of the light at each of time of day to the position detecting device 300, the light source controlling section 320 may not be provided.

The position detecting section 330 detects a three-dimensional position of the light intensity change having occurred in the space, on the basis of the event signal having been received by the event signal receiving section 310, the timing information 340 indicating the angle of the emission of the light by the light source 200 at each time of day, and position information 350 regarding the vision sensor 100 and the light source 200. In the present embodiment, the position detecting section 330 outputs the three-dimensional position of the detected light intensity change, as object position information 360.

The principle of the detection of an object existing in the space by the position detecting section 330 in the present embodiment will be described referring to FIG. 1 again. When light having been emitted by the light source 200 is reflected on an object obj existing in the space, a light intensity change due to reflection light occurs, and the vision sensor 100 detects an event. From a two-dimensional position pos within the field of view of the vision sensor 100 at the event, an angle $\theta_1$ of the object obj relative to the vision sensor 100 as a reference can be identified. Further, as described above, an angle $\theta_2$ of the emission of the light by the light source 200 at each time of day is known. Adding a positional relation between the vision sensor 100 and the light source 200 (which is illustrated as a distance L) to the angles $\theta_1$ and $\theta_2$ makes it possible to identify the three-dimensional position of the object obj according to the principle of triangulation.

As described above, in the present embodiment, the light source 200 emits light having directivity in the form of a line. Therefore, in a case where an event due to reflection light on the object obj has been detected at a certain time of day, it is identified that the object obj exists on a plane formed by the light in the form of a line, which is being emitted at the above time of day. In this case, the angle $\theta_1$ identified from the two-dimensional position pos within the field of view of the vision sensor 100 at the event is a three-dimensional angle, and thus, a point at which, in a three-dimensional space, the plane formed by the above light intersects with a straight line identified by the angle $\theta_1$ can be detected as the three-dimensional position of the object obj. Alternatively, in a case where it is assumed that the object obj is stationary, for example, changing an emission angle, which is an angle at which the light source 200 emits the light having directivity, in a time-series pattern including the change of the emission angle in each of two directions intersecting with each other allows two planes including the object obj to be identified from times of day at which the event has occurred in cases of the emissions of the light in the individual directions, and an angle $\theta_2$ obtained as an angle of an intersection line of the above two planes can be identified as a three-dimensional angle. In this case, the three-dimensional position of the object obj is detected as the intersection point of two straight lines identified by the angles $\theta_1$ and $\theta_2$.

Further, as an additional configuration, as illustrated in FIG. 3, the light source 200 may emit light having directivity in the form of a line having a width. In this case, the event due to the reflection light on the object obj occurs twice with a time difference (the on-event and the off-event). In a case where two angles $\theta_{2\_1}$ and $\theta_{2\_2}$ corresponding to anterior and posterior edges of the light emitted at each time of day are known, the accuracy of the detection of the three-dimensional position can be enhanced by reducing error influence in a way that averages a three-dimensional position that is detected on the basis of an angle $\theta_{1\_1}$ identified at the on-event and the angle $\theta_{2\_1}$ of the anterior edge of the light, and another three-dimensional position that is detected on the basis of an angle $\theta_{1\_2}$ identified at the off-event and the angle $\theta_{2\_2}$ of the posterior edge of the light.

Figure 4:
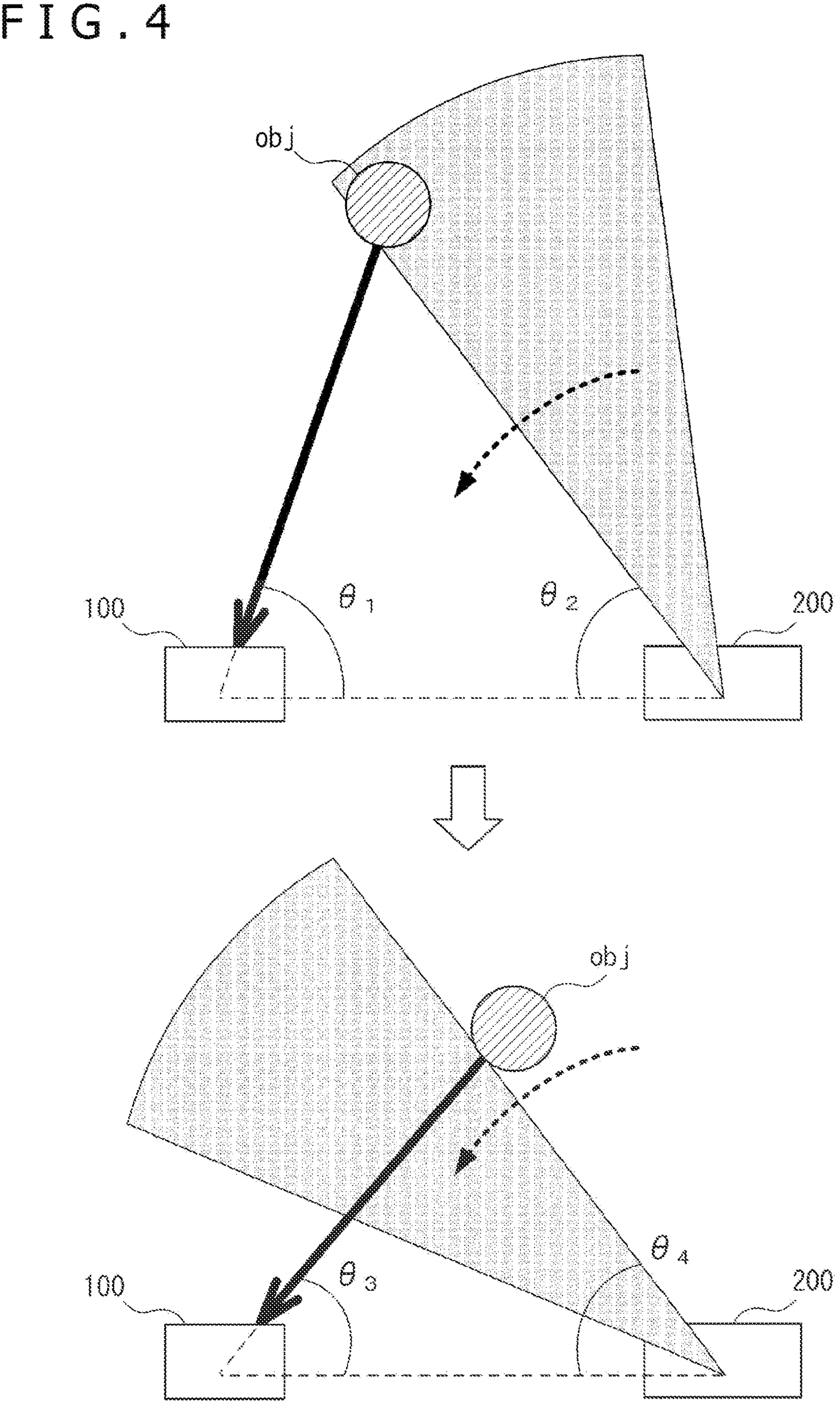
FIG. 4 is a diagram illustrating an additional configuration of the embodiment of the present invention.
Figure 5:
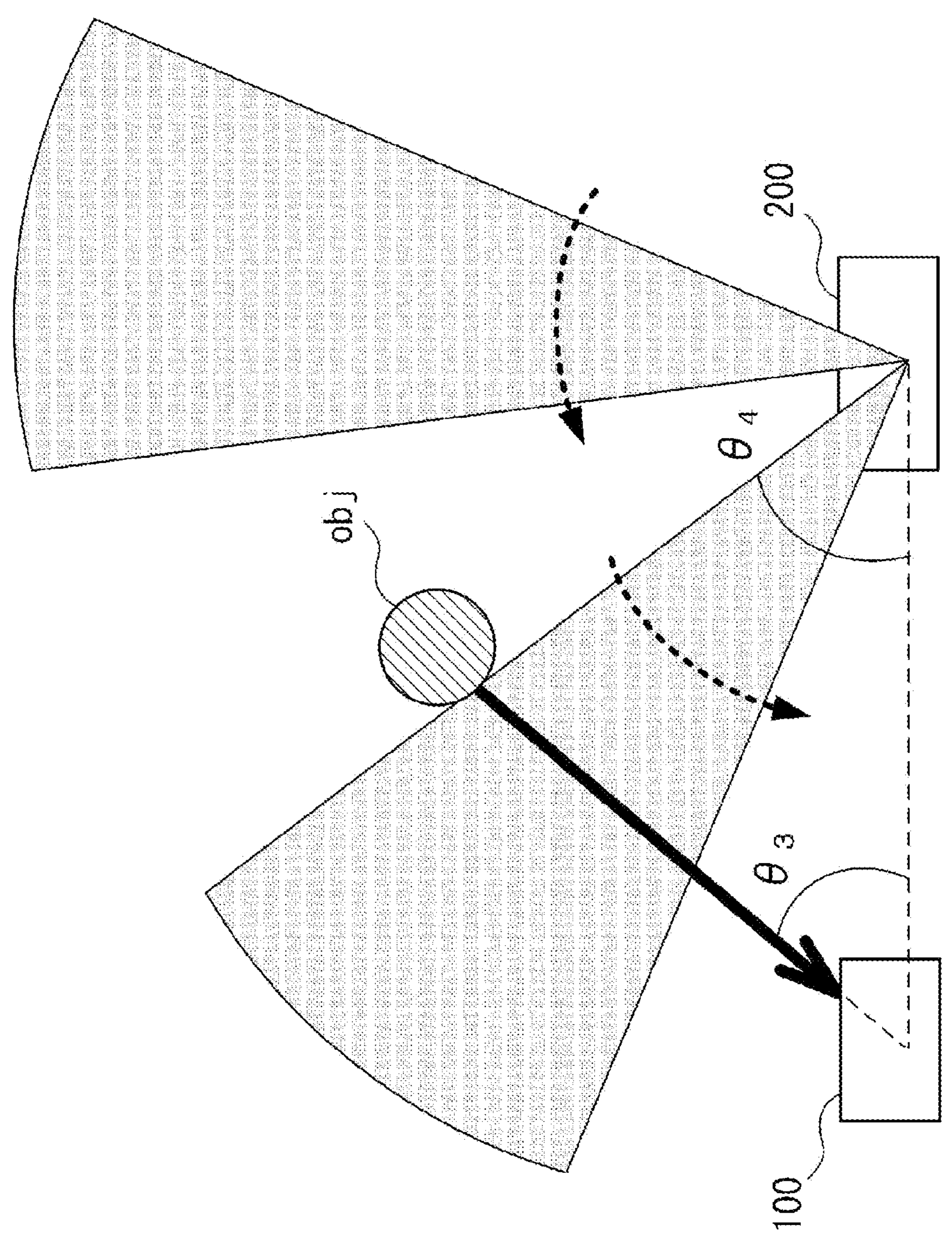
FIG. 5 is a diagram illustrating an additional configuration of the embodiment of the present invention.

As another additional configuration, as illustrated in FIG. 4, the light source 200 may emit light having directivity in the form of a band having a further width. In this case, the light source 200 scans the space by changing the angle of the emission in a time-series pattern in a direction of the width of the band. In this case as well, the event due to the reflection light on the object obj occurs twice with a time difference (the on-event and the off-event). In this regard, however, the time difference is larger than that of the example of FIG. 3, and thus, in a case where, for example, the object obj is moving, the position of the object obj at the on-event is different from the position of the object obj at the off-event. Therefore, a first three-dimensional position that is detected on the basis of an angle $\theta_1$ identified at a first event and an angle $\theta_2$ of the anterior edge of the light and a second three-dimensional position that is detected on the basis of an angle $\theta_3$ identified at a second event and an angle $\theta_4$ of the posterior edge of the light are handled as positions indicating three dimensional positions of the object obj at mutually different times of day. That is, the first three-dimensional position and the second three-dimensional position are handled as time-series changes of the three-dimensional position. For example, as illustrated in FIG. 5, causing the light source 200 to emit light rays having directivity in a plurality of forms of a band so as to arrange the anterior and posterior edges of the light at equal intervals and make the occurrence intervals between the on-events and the off-events equal makes it possible to detect the three-dimensional positions of the object obj by scanning of the space at any cycle.

Figure 6:
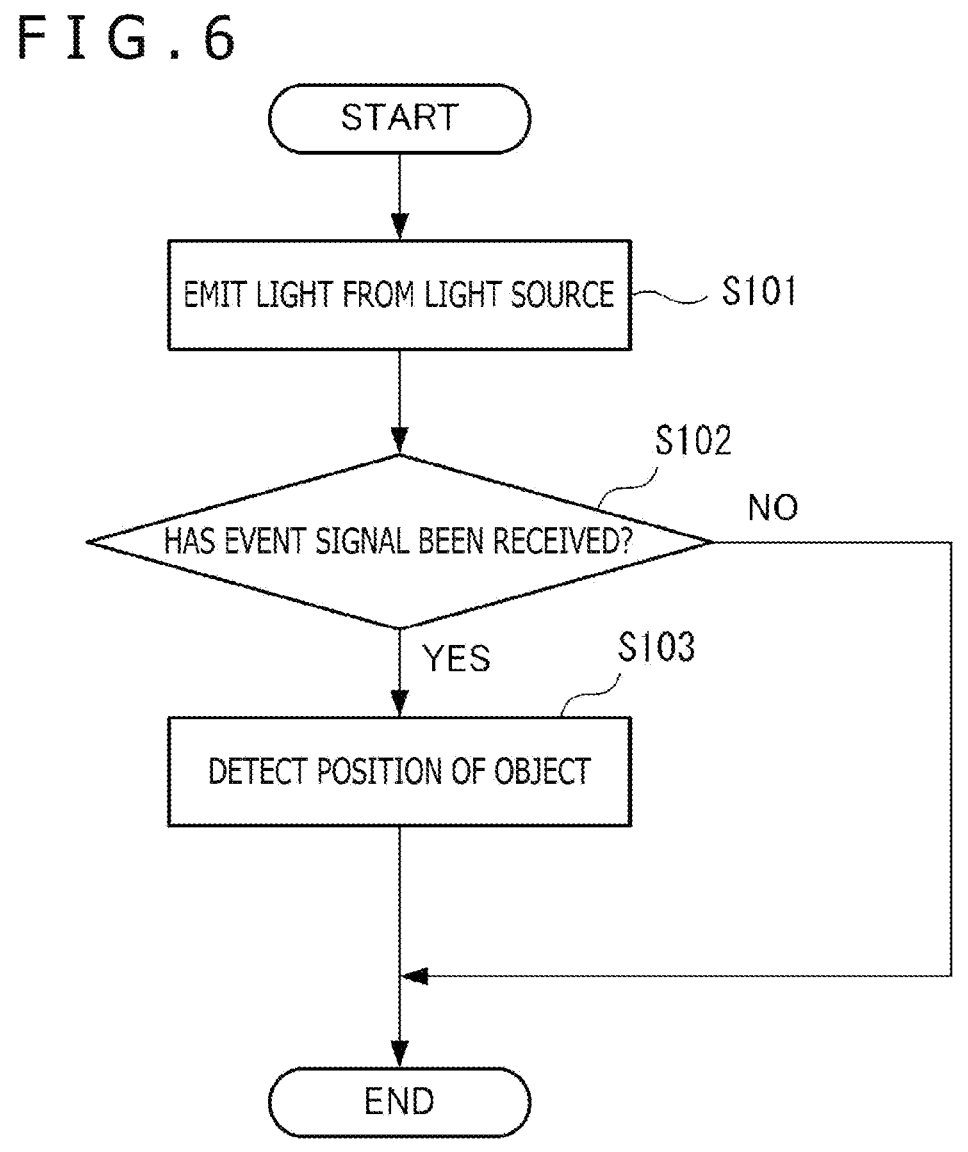

FIG. 6 is a flowchart illustrating an example of processing in the embodiment of the present invention. In the illustrated example, the light is emitted from the light source 200 (step S101), and in a case where an event signal having been generated by the vision sensor 100 is received by the position detecting device 300 (step S102), the position detecting section 330 detects a position at which a light intensity change has occurred, as the position of an object in the space (step S103).

In the above-described embodiment of the present invention, the position of an object in the space can be detected at a high speed and with accuracy. The event-driven type vision sensor operates at a high speed by generating the event signal time-asynchronously, and thus, a time or a cycle needed to detect the position of the object can be shortened within a range of a time resolution of control of a light emission angle by a light source. On the other hand, the position of the object can also be detected by, for example, detecting the reflection of emitted light from an image having been captured by a frame type vision sensor, but the frame type vision sensor operates at a lower speed than the event-driven type vision sensor by a time during which the frame type vision sensor captures the image by time-synchronous scanning, and as a result, the time or the cycle needed to detect the position of the object becomes longer. Further, in a case where the event signal is used, the position at which the light intensity change has occurred is directly identified, and thus, the position can accurately be detected, as compared with a case where, for example, image processing for extracting a reflected image from the image is performed.

The embodiment of the present invention can be utilized in, for example, game controllers, smartphones, and various kinds of mobilities (automobiles, electric automobiles, hybrid electric automobiles, motorcycles, bicycles, personal mobilities, airplanes, drones, ships, robots, etc.) to acquire information regarding surrounding environments, estimate the self-position from surrounding objects, and detect a coming-near flying object to take an avoidance action.

Heretofore, a preferred embodiment of the present invention has been described in detail referring to the accompanying drawings, but the present invention is not limited to such an example. Any person having normal knowledge in the technical field to which the present invention belongs is obviously able to conceive of various kinds of alternative examples and modification examples within the scope of the technical thought set forth in claims of the present specification, and it is naturally understood that such examples also belong to the technical scope of the present invention.

REFERENCE SIGNS LIST

10: System
100: Vision sensor
200: Light source
300: Position detecting device
310: Event signal receiving section
320: Light source controlling section
330: Position detecting section

The invention claimed is:

1. A method comprising:

receiving, from a vision sensor configured to output an event signal indicating a two-dimensional position which is located within a field of view of the vision sensor and at which a light intensity change has occurred in a three-dimensional space, the event signal and a time of day at which the light intensity change has occurred;

adjust a directivity angle for emitting light from a light source towards the three-dimensional space, the emitted light having a form defining an anterior angle and a posterior angle corresponding respectively to an anterior edge and a posterior edge of the emitted light such that a known difference between the anterior angle and the posterior angle is maintained as the directivity angle is adjusted;

determine a three-dimensional position of an object based on (i) detecting a first three-dimensional position of a first light intensity change associated with the anterior edge of the emitted light and (ii) detecting a second three-dimensional position of a second light intensity change associated with the posterior edge of the emitted light; and detecting a plurality of three-dimensional positions corresponding to a plurality of event signals occurring at different times, thereby enabling time-series tracking of the object in the three-dimensional space.

2. A system comprising:

a vision sensor configured to output an event signal indicating a two-dimensional position which is located within a field of view of the vision sensor and at which a light intensity change has occurred in a three-dimensional space, and a time of day at which the light intensity change has occurred;

a light source configured to adjust a first angle for emitting light based on the time of day, the light having a directivity toward the three-dimensional space, the emitted light having a form defining an anterior angle and a posterior angle corresponding respectively to an anterior edge and a posterior edge of the emitted light such that a known difference between the anterior angle and the posterior angle is maintained as the first angle is adjusted; and a position detecting device configured to receive the event signal, the position detecting device further configured to determine a three-dimensional position of an object based on (i) detecting a first three-dimensional position of a first light intensity change associated with the anterior edge of the emitted light and (ii) detecting a second three-dimensional position of a second light intensity change associated with the posterior edge of the emitted light, wherein the position detecting device is further configured to detect a plurality of three-dimensional positions corresponding to a plurality of event signals occurring at different times, thereby enabling time-series tracking of the object in the three-dimensional space.

3. The system according to claim 2, wherein the light source is configured to change the first angle in a time-series pattern.

4. The system according to claim 3, wherein the time-series pattern includes changing the first angle in each of two directions intersecting with each other in the three-dimensional space.

5. The system according to claim 2, wherein the light source is configured to emit the light having directivity in a form having a width that increases with distance from the light source, the position detecting device further configured to receive a first event signal indicating an increase of the light intensity and a second event signal indicating a decrease of the light intensity, and the position detecting device further configured to (i) detect the first three-dimensional position based on the anterior angle of the anterior edge of the light having directivity at the time of day indicated by the first event signal, the two-dimensional position indicated by the first event signal, and a positional relation between the vision sensor and the light source, (ii) detect the second three-dimensional position based on the posterior angle of the posterior edge of the light having directivity at the time of day indicated by the second event signal, the two-dimensional position indicated by the second event signal, and the positional relation, and (iii) determine the three-dimensional position based on an average of the first three-dimensional position and the second three-dimensional position.

6. The system according to claim 2, wherein the light source is configured to emit the light having directivity in a form of a band, the position detecting device further configured to receive a first event signal indicating an increase of the light intensity and a second event signal indicating a decrease of the light intensity, and the position detecting device further configured to (i) detect the first three-dimensional position based on the anterior angle of the anterior edge of the light having directivity at the time of day indicted by the first event signal, the two-dimensional position indicated by the first event signal, and a positional relation between the vision sensor and the light source, (ii) detect the second three-dimensional position based on the posterior angle of the posterior edge of the light having directivity at the time of day indicated by the second event signal, the two-dimensional position indicated by the second event signal, and the positional relation, and (iii) handle the first three-dimensional position and the second three-dimensional position as time-series changes of the three-dimensional position.

7. The system according to claim 2, wherein determining the three-dimensional position of the object based on the first three-dimensional position and the second three-dimensional position associated with the same emitted light increases an accuracy of the determining of the three-dimensional position of the object.

8. A system comprising:

a processor; and a computer-readable medium having stored thereon instructions that, when executed with the processor, cause the system to:

receive, from a vision sensor configured to output an event signal indicating a two-dimensional position which is located within a field of view of the vision sensor and at which a light intensity change has occurred in a three-dimensional space, the event signal and a time of day at which the light intensity change has occurred;

adjust a directivity angle for emitting light from a light source towards the three-dimensional space, the emitted light having a form defining an anterior angle and a posterior angle corresponding respectively to an anterior edge and a posterior edge of the emitted light such that a known difference between the anterior angle and the posterior angle is maintained as the directivity angle is adjusted;

determine a three-dimensional position of an object based on (i) detecting a first three-dimensional position of a first light intensity change associated with the anterior edge of the emitted light and (ii) detecting a second three-dimensional position of a second light intensity change associated with the posterior edge of the emitted light; and detect a plurality of three-dimensional positions corresponding to a plurality of event signals occurring at different times, thereby enabling time-series tracking of the object in the three-dimensional space.

9. A non-transitory, computer readable storage medium containing a program, which when executed, causes a computing device to, at least:

receive, from a vision sensor configured to output an event signal indicating a two-dimensional position which is located within a field of view of the vision sensor and at which a light intensity change has occurred in a three-dimensional space, the event signal and a time of day at which the light intensity change has occurred;

adjust a directivity angle for emitting light from a light source towards the three-dimensional space, the emitted light having a form defining an anterior angle and a posterior angle corresponding respectively to an anterior edge and a posterior edge of the emitted light such that a known difference between the anterior angle and the posterior angle is maintained as the directivity angle is adjusted;

determine a three-dimensional position of an object based on (i) detecting a first three-dimensional position of a first light intensity change associated with the anterior edge of the emitted light and (ii) detecting a second three-dimensional position of a second light intensity change associated with the posterior edge of the emitted light; and detect a plurality of three-dimensional positions corresponding to a plurality of event signals occurring at different times, thereby enabling time-series tracking of the object in three-dimensional space.

* * * * *